United States Patent Office 3,439,261
Patented Apr. 15, 1969

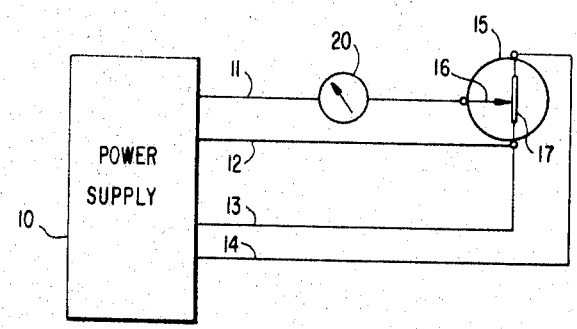
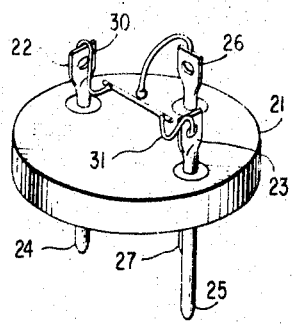
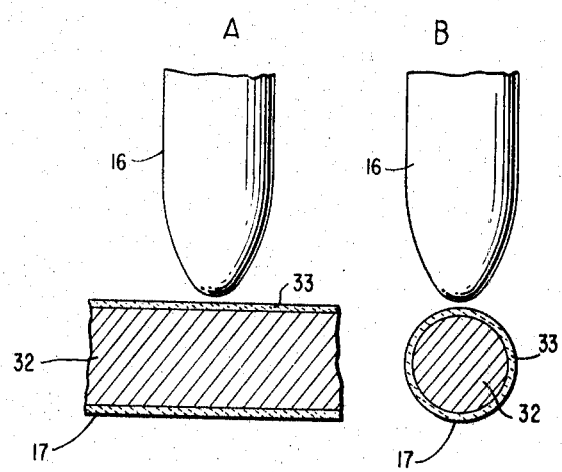
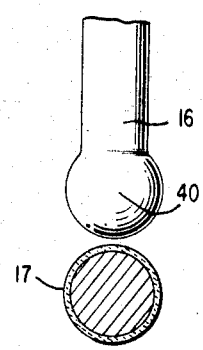

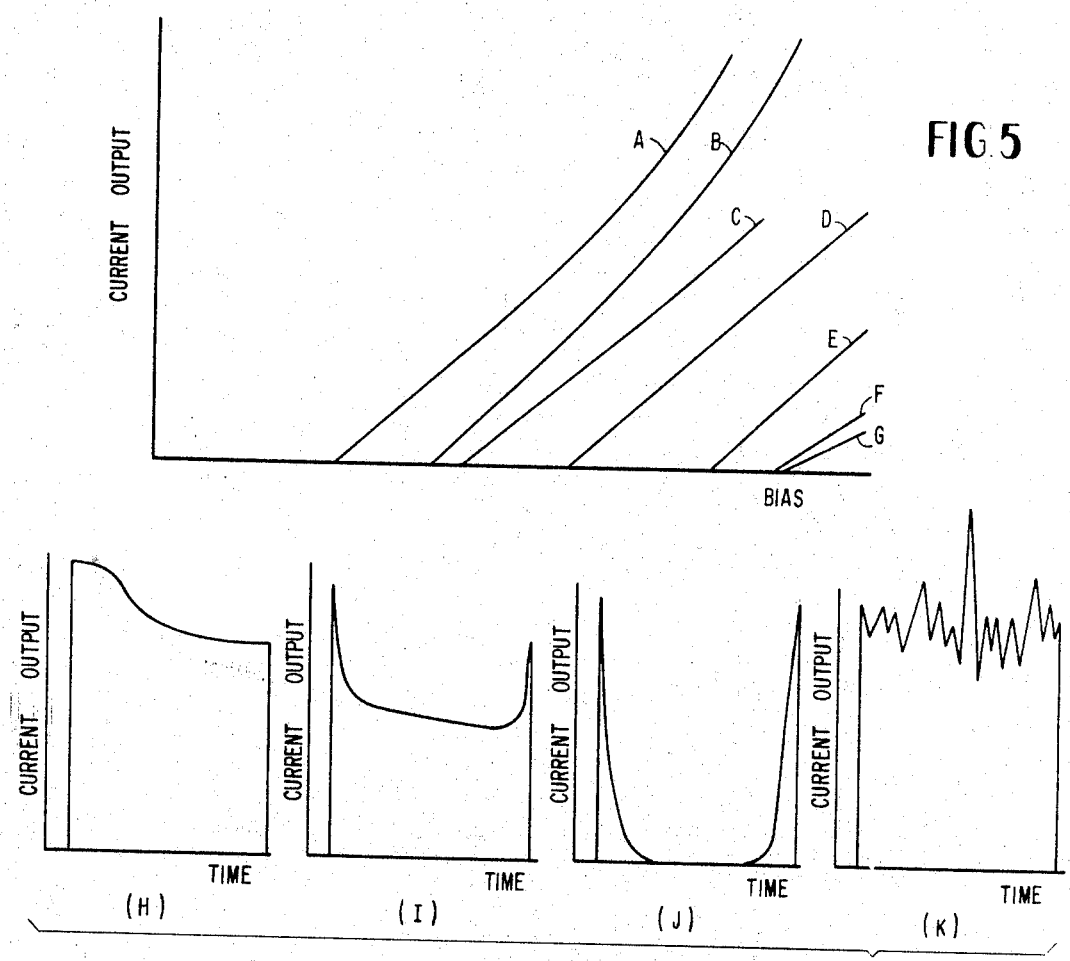
FIG. 5
FIG. 6
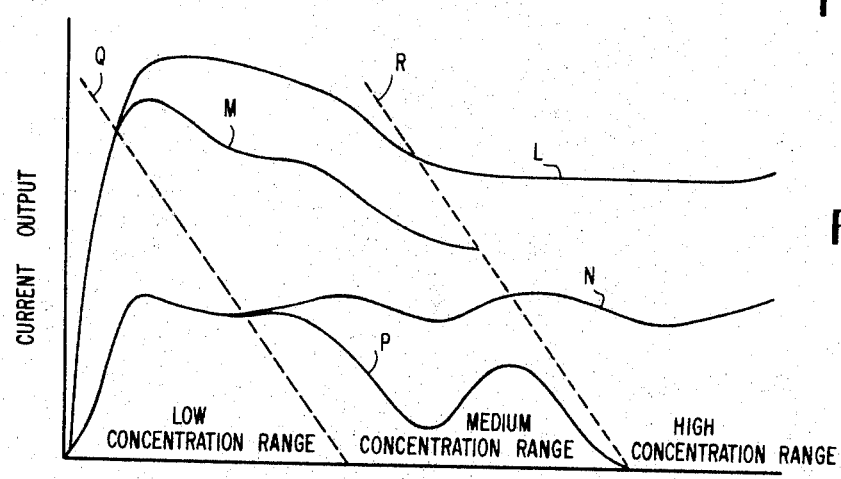
FIG. 7

3,439,261
**COMBUSTIBLE GAS DETECTOR USING
A CORONA DISCHARGE**
Jack C. Loh, Peabody, and Robert S. Norman, Marblehead, Mass., assignors to General Electric Company, a corporation of New York
Filed Sept. 30, 1966, Ser. No. 583,257
Int. Cl. G01n 27/00, 27/62
U.S. Cl. 324—33                                   11 Claims This invention is directed to a combustible gas detector and more specifically to a corona discharge detector for sensing the presence of combustible gases in the atmosphere.

Solutions to the problem of detecting combustible gas leakage have resulted in several divergent approaches as illustrated by the following examples. In one detection scheme a reference gas and a sampled gas are combined. As the mixture has a lower ion current than the reference gas when subjected to the output from an electron gun, the current is substantially proportional to the gas concentration. Although this type of detector is relatively sensitive to low gas concentrations, the requirements for a reference gas source and means for supplying a constant electric field and electron beam make a compact sensing unit practicably impossible.

In another gas detector, color changes of a heated filament, caused when a combustible gas is present, are sensed by a solar cell. This device was an improvement over the flame detector because it avoided the use of a flame in a combustible atmosphere and reliance on the resistance change of a filament-like member in the presence of a gas. In the solar cell scheme, radiant emission is used as a detector and this in turn controls a relay in an alarm circuit. Several characteristics of such a combustible gas detector tend to make it insensitive and unreliable. First, if a current surges through the filament, it glows brighter without the addition of a combustible gas. In addition, solar cells are not extremely sensitive to slight color changes caused by gas concentration variations.

In still another application a hot platinum wire changes resistance due to an exothermic reaction at the platinum catalyst surface. Although hot wires are relatively sensitive, reliability in terms of life is not good because the filament is raised to a high temperature which tends to shorten the life of the platinum wire. In addition, the platinum hot wire detector sensitivity is limited to a range between low concentrations and the explosive limit.

Another combustible gas detector system which provides complete coverage of the gas concentration includes a pair of thermocouples in a bridge circuit with a first thermocouple constituting a standard and the second having means to force an atmosphere to be tested therethrough. If a combustible gas is present, it combusts in the second enclosure and changes the second thermocouple output to cause a bridge imbalance. However, in some applications this type of device is not sufficiently sensitive.

Therefore, it is an object of this invention to provide a combustible gas detector which is sensitive to a wide range of combustible gas concentrations.

Another object of this invention is to provide a combustible gas detector which is characterized by having a relatively long life.

Still another object of this invention is to provide a combustible gas detector which is characterized by a relatively small size.

Yet another object of this invention is to provide a combustible gas detector which is sensitive to low gas concentrations.

Another object of this invention is to provide a combustible gas detector which is reliable and which has good repeatability.

In essence, a combustible gas detector constructed in accordance with this invention detects the presence of a combustible gas by passing the gaseous medium through a gap between two electrodes connected to a potential source so changes in corona current occur when a combustible gas is present. More specifically, a noble metal anode and an oxide-coated cathode are spaced and energized to a level between the corona start voltage for the combustible gas and the spark potential of the gap. If a combustible gas appears in the medium, the corona start voltage of the mixture decreases and an increase in corona current occurs.

This invention has been pointed out with particularity in the appended claims. A more thorough understanding of the above objects and further advantages of this invention may be had by referring to the following detailed description taken in conjunction with the accompanying drawings wherein:

FIGURE 1 schematically illustrates a combustible gas detector constructed in accordance with this invention;

FIGURE 2 illustrates one embodiment of a sensor utilized in such a detector as shown in FIGURE 1;

FIGURE 3 presents two detailed views of electrodes which can be used in a sensor such as shown in FIGURE 2;

FIGURE 4 illustrates another electrode configuration for a sensor;

FIGURE 5 illustrates the corona discharge voltage for various concentrations of natural gas and methane;

FIGURE 6 presents an analysis of current output produced by such a sensor; and

FIGURE 7 illustrates the relationship of current output with gas concentrations.

Before proceeding with the description of a combustible gas detector formed in accordance with this invention, it will be helpful to review the theoretical nature of an electrical discharge from points and wires, called corona. If an electrical potential is applied across separated electrodes of the different sizes, the field which concentrates at the electrodes can become sufficiently high to cause a breakdown in these regions before a potential is reached which will cause a spark to be propagated between the electrodes. The voltage at which this breakdown occurs can be defined as the corona start voltage. Generally, the breakdown occurs first at the electrodes and then through the gap as the potential is increased above the corona start voltage. In the absence of external ionization, no appreciable current flow exists below the corona start voltage. If ionization is present, the corona start voltage for the gap is lowered so a change in current may occur for a fixed potential. The corona start voltage in a gaseous medium is also a function of the gas concentration and the distance between the electrodes. If the distance between the electrodes remains constant and the concentration of the gas changes, there will be a change in the corona start voltage.

If a gas is introduced which is capable of being ionized, the corona start voltage tends to be lowered. Combustible gases are generally ionizable at a potential which is less than the potential required to ionize the atmosphere. Therefore, if atmosphere free of combustible gases is utilized as a reference, the introduction of a combustible gas into the atmosphere causes a change in the corona start voltage between two spaced electrodes.

FIGURES 1, 2, and 3 illustrate a device for detecting a combustible gas to include the views of a sensor capable of incorporating this invention which is shown schematically in FIGURE 1, in perspective in FIGURE 2 and in detail in FIGURE 3. A power supply 10 having a plurality of conductors 11 through 14 energizes a sensor 15 which detects combustible gases in accordance with this invention. The sensor 15 includes an anode 16 and a cathode 17. Conductors 11 and 12 serve to place a D-C potential on the anode 16 and the cathode 17 which is greater than the corona start voltage for combustible gases but which is less than the sparking potential in atmosphere. If current, hereinafter corona current, flows in this circuit, it is measured by a meter 20, in series between the power supply 10, the anode 16, and the cathode 17, which indicates changes in the corona current. It will be obivous, however, that the meter 20 could be replaced by an alarm device or any other utilization means required in a particular application. The remaining conductors 13 and 14 are connected in series with the cathode 17, formed as a wire, to produce a heating current through the cathode for purposes to be described hereinafter.

FIGURE 2 illustrates on embodiment of a sensor wherein a base member 21 has a plurality of electrically conductive supporting elements mounted thereon. Two of the supporting elements 22 and 23 extend through the base member 21 to form pin connections 24 and 25, respectively. Another supporting element 26 extends through the base member 21 to form a pin connection 27. Suspended between the supporting elements 22 and 23 is the cathode 17. In order to overcome thermal and mechanical shock, a pair of conductors 30 and 31 support the cathode 17 and are connected to the supporting elements 22 and 23. This is a diagrammatic view of the sensor only; and, as will become obvious from the discussion hereinafter, the critical element of such a supporting structure is that it rigidly supports the relative positions of the cathode and anode so that spacing between these two elements remains constant.

Now referring to FIGURES 3A and 3B, the detailed structure of the anode and cathode will be considered along with the operation of the device. The anode 16 can be formed from platinum or any other noble metal which is not reactive with the combustible gas. The cathode 17 is formed in two portions, a core 32 and a coated portion 33. The coated portion 33 can be formed of a metal oxide and the core is formed of a material which is compatible with the oxide for purposes of obtaining the third coating. Two particular oxide coatings found to be effective in this application are tungsten trioxide and titanium oxide. If tungsten trioxide, which provides better results, is used, a core portion 32 of tungsten or platinum is used whereas when a titanium oxide coating is used, the core 32 should be formed of either platinum or titanium. Such a coating is formed by coating a metal onto the core and then oxidizing the metal. For example, a tungsten core would be coated with a tungsten film and then oxidized.

If a tungsten wire covered with a tungsten trioxide film cathode 17 is closely spaced to a pointed platinum wire anode 16 as illustrated in FIGURE 3 and if the potential applied across the electrodes is below the corona start voltage of air but above the ionization potential of a combustible gas (such as hydrogen) introduced into the air, the hydrogen molecules are ionized as they enter into the the electrical field. The positive ions thusly formed are attracted to the cathode, and it is hypothesized that when these positive ions strike the surface they react with negatively charged oxygen ions from the tungsten trioxide to form water molecules and release electrons from tungsten ions. Furthermore, once a positive hydrogen ion is liberated and strikes the cathode surface, it starts an outward-moving electron avalanche which in turn liberates additional electrons from positive tungsten ions which in turn start new electron avalanches. As soon as these liberated electrons are collected at the anode, a current through the gap is produced.

As the potential across the gap is increased, a space charge accumulation must increase in order to choke off corona bursts caused by the avalanches. Eventually, however, a sparking potential is reached where the space charge no longer chokes off the bursts and fluctuating bursts of corona can be observed. Hence, if the starting potential applied across the gap is greater than the corona start voltage for the combustible gas to be detected, but is less than the sparking potential of air, a good indication of the presence of combustible gas will be provided because, with a constant bias voltage, the corona current across the gap increases in the presence of a combustible gas.

Before proceeding with the analysis and discussion of the operation of a corona gas detector, two additional parameters must be examined. One of these is the physical spacing between the anode 16 and the cathode 17. It has been found that the electrodes should be separated by a distance in the range from 0.3 to 0.7 mil, 0.5 mil constituting an optimum spacing. If the spacing is increased beyond the 0.7 mil limit, the detector loses sensitivity rapidly. Spacings less than 0.3 mil are difficult to maintain. The 0.5 mil spacing has been found to be the optimum spacing for corona discharge at atmospheric pressure.

As mentioned hereinabove, the conductors 13 and 14 shown in FIGURE 1 supply a heating current to the cathode 17 to maintain the cathode temperature sufficiently high to eliminate any water adsorbed on the cathode surface. If the cathode 17 is not heated, a high background current occurs which may equal the corona current for low gas concentrations. If such high background currents exist, current fluctuations occur and thereby cause difficulties in calibration. By heating the cathode, the adsorbed water vapor evaporates. This cathode temperature can be held at a relatively low value so the heating current has relatively no effect on the cathode life.

An alternative embodiment of an anode structure is shown in FIGURE 4 wherein a spherical portion 40 is formed at the end of the anode 16. This portion can be formed by heating the end portion of the platinum anode to form a generally spherically shaped drop of molten platinum. When this drop cools, a relatively smooth and inexpensive tip is formed. In addition, when the anode and cathode are spaced by 0.5 mil, only a single point on the anode is at that spacing, and a true point electrode exists.

FIGURE 5 illustrates the relationship of sensor current output of varying bias across the gap for various gas concentrations of different combustible gases. Curves A and B illustrate the current output of a sensor for two concentrations of natural gas, the concentration of curve B being less than that of curve A. Therefore, it can be seen that for a given potential, the output current will increase with an increasing concentration of natural gas. Similarly, curves C, D, E, F, and G illustrate the current outputs for decreasing concentrations of methane. Again, at a given voltage the output current increases with increasing gas concentration. Furthermore, it will be noted that all the gases in each concentration vary substantially linearly with respect to the bias.

FIGURE 6 presents four illustrations which depict the wave form of a current output in terms of time for various gas concentration-bias combinations. In the low concentration region illustrated by FIGURE 6(H) the output is stable although it decreases with time. At a medium concentration shown in FIGURE 6(I), there is a high initial surge and then the output decreases to a lower value with a final surge being noted when the gas is removed. When ionization starts, the number of positive ions apparently has not reached a density to block the path of some electrons so that the initial surge results. However, as soon as the positive ion density increases to block the paths of some electrons, a certain percentage of electrons are not collected by the anode so the output is decreased. When the gas in subsequently removed, the positive ion density is again decreased so that more electrons are collected at the anode and a final surge results.

Output of a high concentration with a low bias is illustrated in FIGURE 6(J). Only an initial and final surge are produced, no output being produced in the interim time period. As soon as the gas enters the field, the positive ion density is relatively low and electrons move from the cathode to the anode. Shortly, however, the positive ion density increases and blocks the electron path so that the corona chokes off. When the gas is removed, the positive ion density decreases and electrons again flow to the anode to provide a final surge.

If the bias is increased to a high value, the curve of FIGURE 6(K) results, which depicts an initial surge and a final surge with fluctuating bursts of corona between the surges. This illustrates what happens when a sparking potential causes self-sustaining bursts of corona so that no external ionization is needed.

FIGURE 7 illustrates, in conjunction with FIGURE 6, the various current outputs for two biases when the detector senses natural gas at various concentrations. Curves L and N illustrate the initial peak surge currents which are produced at a first and second bias, while curves M and P illustrate the current outputs which result after the initial surge has subsided for these biases. The dashed lines Q and R serve to define the various concentrations of natural gas into low, medium, and high concentration ranges.

In the low concentration region with the first bias the current varies linearly as the concentration of the natural gas. Similarly, it is noted that the sensitivity is a function of the bias; that is, a higher bias increases the output current. Once the low concentration range is exceeded, the output exhibits an initial surge current and then settles to a lower output current. In the high concentration range the initial surge current still exists, but the output becomes zero in the case of curve P. Fluctuating bursts of pulse corona exist in the case of curve M when the high concentration is reached so a current such as that shown in FIGURE 6(K) exists which is not shown in FIGURE 7. Similar graphs can be experimentally found for other combustible gases. The low, medium, and high concentration ranges are determined primarily by the bias voltage with the low concentration range extending to a higher concentration level as the bias is increased. Similarly, the concentration at which the current output becomes undefinable is lower for a lower bias. Hence, the choice of bias depends primarily on the particular application which is desired. However, the required bias variation is relatively small; in one experimental condition, a bias variation of less than 2% caused the difference of output current level represented by curves M and P.

From these graphs it can be seen that a sensitive combustible gas detector results if the corona discharge section of it is utilized. When a sensor produced by utilizing a tungsten trioxide cathode on a tungsten core and a platinum anode spaced 0.5 mil from the cathode was utilized with a bias of 375 volts applied across the anode and cathode, the sensors were sensitive to concentrations of less than 0.5% methane in air.

Qualitative analysis of the corona discharge gas detector to various types of gases is illustrated by the following chart:

RESPONSE TO GASES

| None | Small | Large |
|------|-------|-------|
| Freon 12 | CO | $CH_4$ (methane). |
| $CO_2$ | $CS_2$ | $C_3H_8$ (propane). |
| $N_2O$ | | $CH_3C_6H_5$ (toluene). |
| $O_2$ | | $CH_3OH$ (methyl alcohol). |
| HCl | | $C_2H_5OH$ (ethyl alcohol). |
| $N_2$ (in air) | | $CH_3COCH_3$ (acetone). |
| | | $C_6H_6$ (benzene). |
| $C_6H_5NO_2$ | | $H_2$. |
| | | $CH_3NO_2$ (nitromethane). |

From this chart it can be seen that the combustible gases all exhibit a large current output as opposed to like concentrations of noncombustible gases. Hence, by varying the bias applied to the electrodes, the gas detector can be easily adjusted to sense the presence of any of the combustible gases in the atmosphere at very low concentrations thereof. However, if an oxidizing gas is present, either no response or a very small response occurs.

In summary, a sensor constructed in accordance with this invention defines a gap between an electrode formed of a metal oxide on a metal core and a point electrode of a noble metal. When the electrodes are energized at a value greater than the corona start voltage for the various combustible gases but less than the sparking potential for the gap, the corona start voltage decreases and some corona discharge occurs as a corona current when a combustible gas passes through the gap. Means are provided for measuring this current to thereby indicate the presence of the gas. Although a single embodiment has been shown in this disclosure, it is realized that other embodiments can be made by those persons with ordinary skill in the art without departing from the true spirit and scope of this invention. For example, the bias applied to the sensor could be set to cause a low background current in the atmosphere and a substantial current increase when a combustible gas is presented.

What we claim as new and desire to secure by Letters Patent of the United States is:

1. A sensor for detecting the presence of a hydrocarbon gas comprising:
   (a) support means;
   (b) a cathode mounted on said support means including an oxide coating of a metal taken from the group consisting of titanium and tungsten;
   (c) a noble metal anode mounted on said support means having a smooth surface tip formed thereon, the surface of said tip being spaced from said cathode by a distance from 0.3 mil to 0.7 mil to define a corona discharge gap;
   (d) means for heating said cathode; and
   (e) terminal means mounted on said support means connected to said anode and said cathode for connecting said anode and said cathode to a bias source capable of supplying a voltage between the corona start voltage of the hydrocarbon gas to be detected and the sparking potential of said gap whereby a corona discharge occurs across said gap with a resultant corona current which increases in the presence of the hydrocarbon gas.

2. A sensor as recited in claim 1 wherein said cathode oxide coating is tungsten trioxide.

3. A sensor as recited in claim 1 wherein said cathode and anode are spaced by 0.5 mil.

4. A sensor as recited in claim 3 wherein said anode is formed of platinum and the tip of said anode is spherically shaped.

5. A sensor as recited in claim 4 wherein said cathode has first and second terminal means connected thereto, said first terminal means adapted to be connected to the bias source and said first and second terminal means being adapted to connect said cathode to a heating current source.

6. A hydrocarbon gas detector comprising:
   (a) support means;
   (b) a cathode mounted on said support means including an oxide coating of a metal taken from the group consisting of titanium and tungsten;
   (c) a noble metal anode mounted on said support means having a smooth surface tip formed thereon, the surface of said tip being spaced from said cathode by a distance from 0.3 mil to 0.7 mil to define a corona discharge gap;
   (d) means for heating said cathode; and
   (e) power supply means connected for energizing said anode and said cathode to impress a potential across said gap which is greater than the corona start voltage of the hydrocarbon gas to be detected and less than the sparking potential of said gap, said power supply means including indicating means responsive to increased current flow across said gap when the hydrocarbon gas is passed through said gap to indicate the presence of the hydrocarbon gas.

7. A hydrocarbon gas detector as recited in claim 6 wherein said cathode has a core portion and a coating thereon, said coating being composed of said metal oxide and said core being composed of a metal compatible with said coating for good bonding and taken from the group consisting of titanium, tungsten, and platinum.

8. A hydrocarbon gas detector as recited in claim 7 wherein said cathode oxide coating is tungsten trioxide.

9. A hydrocarbon gas detector as recited in claim 8 wherein said anode and said cathode are spaced by 0.5 mil.

10. A sensor as recited in claim 9 wherein said anode is formed of platinum and the tip of said anode is spherically shaped.

11. A hydrocarbon gas detector as recited in claim 10 wherein said power supply means additionally includes means for providing a heating current for said cathode connected in series therewith.

References Cited
UNITED STATES PATENTS

| | | | |
|---|---|---|---|
| 2,640,870 | 6/1953 | Seitz | 324—33 |
| 2,854,625 | 9/1958 | Dudley et al. | 324—33 |
| 2,933,676 | 4/1960 | Stokes et al. | 324—33 |

RUDOLPH V. ROLINEC, *Primary Examiner.*

C. F. ROBERTS, *Assistant Examiner.*

U.S. Cl. X.R.

313—217, 218